United States Patent
D'Halluin et al.

(10) Patent No.: US 12,111,794 B2
(45) Date of Patent: Oct. 8, 2024

(54) REPLICATION BARRIERS FOR DEPENDENT DATA TRANSFERS BETWEEN DATA STORES

(71) Applicant: Western Digital Technologies, Inc., San Jose, CA (US)

(72) Inventors: Carl D'Halluin, Ghent (BE); Thomas Demoor, De Haan (BE)

(73) Assignee: Western Digital Technologies, Inc., San Jose, CA (US)

( * ) Notice: Subject to any disclaimer, the term of this patent is extended or adjusted under 35 U.S.C. 154(b) by 382 days.

(21) Appl. No.: 16/702,333

(22) Filed: Dec. 3, 2019

(65) Prior Publication Data

US 2021/0165768 A1    Jun. 3, 2021

(51) Int. Cl.
*G06F 16/18* (2019.01)
*G06F 16/17* (2019.01)
*G06F 16/182* (2019.01)

(52) U.S. Cl.
CPC ...... *G06F 16/1844* (2019.01); *G06F 16/1734* (2019.01); *G06F 16/1824* (2019.01); *G06F 16/1858* (2019.01)

(58) Field of Classification Search
CPC ............. G06F 16/1844; G06F 16/1734; G06F 16/1824; G06F 16/1858; G06F 11/1443; G06F 11/2094; G06F 2201/84; G06F 16/27
See application file for complete search history.

(56) References Cited

U.S. PATENT DOCUMENTS

| | | | |
|---|---|---|---|
| 6,026,413 A | 2/2000 | Challenger et al. | |
| 7,457,830 B1 | 11/2008 | Coulter et al. | |
| 7,490,083 B2 | 2/2009 | Bourbonnais et al. | |
| 8,387,066 B1 | 2/2013 | Becher et al. | |
| 9,195,516 B2 | 11/2015 | Faraj | |
| 10,409,770 B1* | 9/2019 | Ye | G06F 16/27 |
| 2006/0122977 A1 | 6/2006 | Brodhun et al. | |
| 2007/0288490 A1* | 12/2007 | Longshaw | G06F 16/217 |
| 2011/0295806 A1* | 12/2011 | Erofeev | G06F 11/2094 707/634 |
| 2012/0233139 A1 | 9/2012 | Larson et al. | |

(Continued)

FOREIGN PATENT DOCUMENTS

CN    106294548 A    1/2017

OTHER PUBLICATIONS

International Search Report and Written Opinion of Application No. PCT/US2020/025196, mailed Aug. 28, 2020 (10 pages).

(Continued)

*Primary Examiner* — Pierre M Vital
*Assistant Examiner* — Andrew N Ho
(74) *Attorney, Agent, or Firm* — Patent Law Works LLP

(57) ABSTRACT

Example distributed storage systems, replication managers, and methods provide replication barriers for dependent data transfers between data stores. An object data store may include a barrier object and be configured to identify dependencies between a dependency set of data objects and the barrier object. When replicating data objects to another data store, the dependency set of data objects may be transferred first, delaying the transfer of the barrier object while the dependency set is being transferred.

20 Claims, 9 Drawing Sheets

(56) References Cited

U.S. PATENT DOCUMENTS

| | | | |
|---|---|---|---|
| 2014/0068040 A1* | 3/2014 | Neti | G06F 9/485 |
| | | | 709/223 |
| 2014/0089264 A1 | 3/2014 | Talagala et al. | |
| 2014/0280198 A1 | 9/2014 | Cavage et al. | |
| 2016/0004720 A1 | 1/2016 | Tabaaloute et al. | |
| 2016/0085839 A1 | 3/2016 | D'Halluin et al. | |
| 2017/0103116 A1 | 4/2017 | Hu et al. | |
| 2017/0123931 A1 | 5/2017 | Aizman et al. | |
| 2018/0067941 A1 | 3/2018 | Chambers et al. | |
| 2018/0081958 A1* | 3/2018 | Akirav | G06F 11/1451 |
| 2018/0144044 A1* | 5/2018 | Beach | G06F 11/1417 |
| 2018/0260125 A1* | 9/2018 | Botes | G06F 3/065 |
| 2018/0336237 A1 | 11/2018 | Baid et al. | |
| 2019/0138345 A1 | 5/2019 | Singh et al. | |
| 2019/0171763 A1 | 6/2019 | Cai et al. | |
| 2019/0303009 A1 | 10/2019 | Meiri et al. | |
| 2019/0303254 A1 | 10/2019 | Danilov | |
| 2019/0332692 A1 | 10/2019 | Rachapudi et al. | |
| 2019/0354441 A1* | 11/2019 | Ramachandran | G06F 16/128 |
| 2019/0370351 A1 | 12/2019 | Mithal et al. | |
| 2020/0065141 A1 | 2/2020 | Pai et al. | |
| 2020/0110632 A1 | 4/2020 | Podluzhny | |
| 2020/0401603 A1* | 12/2020 | Driesch, Jr. | G06F 16/2365 |
| 2021/0026744 A1* | 1/2021 | Shveidel | G06F 11/1474 |

OTHER PUBLICATIONS

International Search Report and Written Opinion of Application No. PCT/US2020/025199, mailed Aug. 26, 2020 (10 pages).

International Search Report and Written Opinion of Application No. PCT/US2020/025249, mailed Aug. 26, 2020 (11 pages).

Google Cloud Storage Products, Buckets, Aug. 15, 2019, p. 1-7, Accessed Oct. 3, 2019, https://cloud.google.com/storage/docs/json_api/v1/buckets.

Kibernetes Blog, Simple leader election with Kubernetes and Docker, Jan. 11, 2016. p. 1-7, Accessed Oct. 3, 2019, https://kubernetes.io/blog/2016/01/simple-leader-election-with-kubernetes/.

O'Donnell, MapR Object Store with S3-Compatible API, MapR Technologies, Inc. Technical White Paper, Sep. 2018, p. 1-10, Accessed Oct. 3, 2019, https:/mapr.com/whitepapers/mapr-s3-object-store/.

Oracle Cloud Services, Oracle Cloud Infrastructure Documentation, p. 1-2, Accessed Oct. 3, 2019, https://docs.cloud.oracle.com/iaas/Content/Object/Tasks/understandingnamespaces.htm.

Patel, A Pragmatic Testbed for Distributed Systems, Thesis, Nov. 2017, p. 1-80, University of Ontario Institute of Technology, https://ir.library.dc-uoit.ca/bitstream/10155/873/1/Patel_Parth.pdf.

Streams Replication Administrator's Guide, Oracle Help Center Online Article, Accessed Aug. 7, 2019, p. 1-19, https://docs.oracle.com/cd/B19306_01/server.102/b14228/gen_rep.htm#STREP011.

* cited by examiner

REPLICATION BARRIERS FOR DEPENDENT DATA TRANSFERS BETWEEN DATA STORES

TECHNICAL FIELD

The present disclosure generally relates to data storage, and in a more particular example, to transferring dependent data between data stores.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

A storage system node may store a set of data objects and/or object versions and those objects may be replicated to one or more other storage system nodes to provide redundancy for data recovery, response time, volume, load balancing, data retention policies, and other considerations. In some configurations, all objects from a node are copied to one or more other nodes and vice versa, in an attempt to synchronize the data objects present on each node. Replication may be unidirectional or multidirectional, and scalable systems may employ parallel replication to improve efficiency, reliability, and throughput of such systems. Service and network variations, system failures, and parallel replication may mean that replication order cannot be assumed or guaranteed based solely on the order of a replication queue or log from which the replication requests are being generated. Each data object may move between nodes independent of the other data objects.

In some configurations, some data objects may be dependent upon other data objects to be valid. For example, some systems use snapshots of higher-level structures, such as all data objects in a node or logical structure, data object metadata, log information, databases, data structures pointing to a blobstore, or similar aggregations of information related to other data objects, and these snapshots may cease to be valid if the underlying set of data objects (and their related metadata) change. This may create problems when data objects are replicated out of order and a system can no longer guarantee that the dependent data object has all of the dependencies intact. For example, when a marker or dependent data object that references a set of other objects arrives at a node while the data objects to which it refers are delayed or fail to replicate due to a system crash, network error, or other problem, the resulting marker object, snapshot, or other dependent data object may be invalid.

Some systems have used strictly ordered replication with confirmation, such as an ordered replication journal, to avoid problems created by out-of-order replication. However, such systems may not scale well when nodes include a billion or more objects and scans to identify missing data objects may require more time and computational resources than are practical. Forcing one-at-a-time replication may be prohibitive to replicating large systems in a timely and resource efficient manner. Similarly, auditing the set of dependency objects after the dependent data object is received, in order to detect missing objects after replication, may be impractical for large data sets.

As large-scale storage systems scale and create more dependent data objects that depend on increasingly large dependency sets, reliable and efficient implementations for managing dependent data objects may be needed. A need exists for at least replication barriers for dependent data transfers between data stores.

SUMMARY

Various aspects for data object replication, particularly, the use of replication barriers for dependent data transfers among data stores are described.

One general aspect includes a system that includes: a first object data store configured to store a first plurality of data objects, where the plurality of data objects includes a dependency set of data objects; a barrier engine configured to identify a dependency between the dependency set of data objects and a barrier object in the first plurality of data objects; and a replication manager configured to transfer the first plurality of data objects from the first object data store to a second object data store by transferring the dependency set of data objects to the second object data store and delaying, while the replication manager is transferring the dependency set of data objects to the second object data store, the transfer of the barrier object to the second object data store.

Implementations may include one or more of the following features. The replication manager may be further configured to use a plurality of replication engines operating in parallel to transfer the plurality of data objects. At least one later data object from the plurality of data objects may have a first time value later than a second time value of the barrier object and is not included in the dependency set of data objects. The plurality of replication engines may be configured to transfer the at least one later data object before the barrier object. The barrier object may include a snapshot of the dependency set of data objects. The barrier engine may be further configured to generate the barrier object based on the dependency set of data objects. The first object data store may be further configured to include a plurality of dependency sets in the first plurality of data objects over an operating period. The barrier engine may be further configured to identify a plurality of barrier objects for the plurality of dependency sets at predetermined intervals during the operating period. The replication manager may be further configured to transfer each dependency set of the plurality of dependency sets prior to transferring each corresponding barrier object of the plurality of barrier objects. The barrier engine may be further configured to receive a dependent object identifier for the barrier object from a client application. The barrier engine may be further configured to identify a dependent object identifier from metadata for the barrier object. The barrier engine may be further configured to: identify the barrier object by setting a dependent object identifier in a time-based log entry for the barrier object; and clear, responsive to the replication manager completing transfer of the dependency set of data objects, the dependent object identifier from the time-based log entry for the barrier object.

Another general aspect includes a computer-implemented method that includes: storing a first plurality of data objects in a first data store, where the plurality of data objects includes a dependency set of data objects; identifying a dependency between the dependency set of data objects and a barrier object in the first plurality of data objects; and transferring the first plurality of data objects from the first object data store to a second object data store by: transferring the dependency set of data objects to the second object data store; and delaying, while transferring the dependency set of data objects to the second object data store, the transfer of the barrier object to the second object data store.

Implementations may include one or more of the following features. The computer-implemented method where transferring the dependency set of data objects to the second object data store includes using a plurality of replication engines operating in parallel to transfer the dependency set of data objects. At least one later data object from the plurality of data objects may have a first time value later than a second time value of the barrier object and is not included in the dependency set of data objects. The plurality of replication engines may transfer the at least one later data object before the barrier object. The barrier object may include a snapshot of the dependency set of data objects. The computer-implemented method may further include generating the barrier object based on the dependency set of data objects. The computer-implemented method may further include: storing a plurality of dependency sets in the first data store over an operating period; identifying a plurality of barrier objects for the plurality of dependency sets at predetermined intervals during the operating period; and transferring each dependency set of the plurality of dependency sets prior to transferring each corresponding barrier object of the plurality of barrier objects. The computer-implemented method may further include receiving a dependent object identifier for the barrier object from a client application. The computer-implemented method may further include detecting a dependent object identifier from metadata for the barrier object. The computer-implemented method may further include detecting a dependent object identifier from a data object name for the barrier object. The computer-implemented method may further include: identifying the barrier object by setting a dependent object identifier in a time-based log entry for the barrier object; and clearing, responsive to completing transfer of the dependency set of data objects, the dependent object identifier from the time-based log entry for the barrier object.

Another general aspect includes a system that includes: a first object data store configured to store a first plurality of data objects, where the plurality of data objects includes a dependency set of data objects; means for identifying a dependency between the dependency set of data objects and a barrier object in the first plurality of data objects; and means for transferring the first plurality of data objects from the first object data store to a second object data store by transferring the dependency set of data objects to the second object data store and delaying, while transferring the dependency set of data objects to the second object data store, the transfer of the barrier object to the second object data store.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve dependent data transfer between data stores, such as by using replication barriers to enforce limited ordered replication when transferring dependent data objects and their underlying dependencies between data stores. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
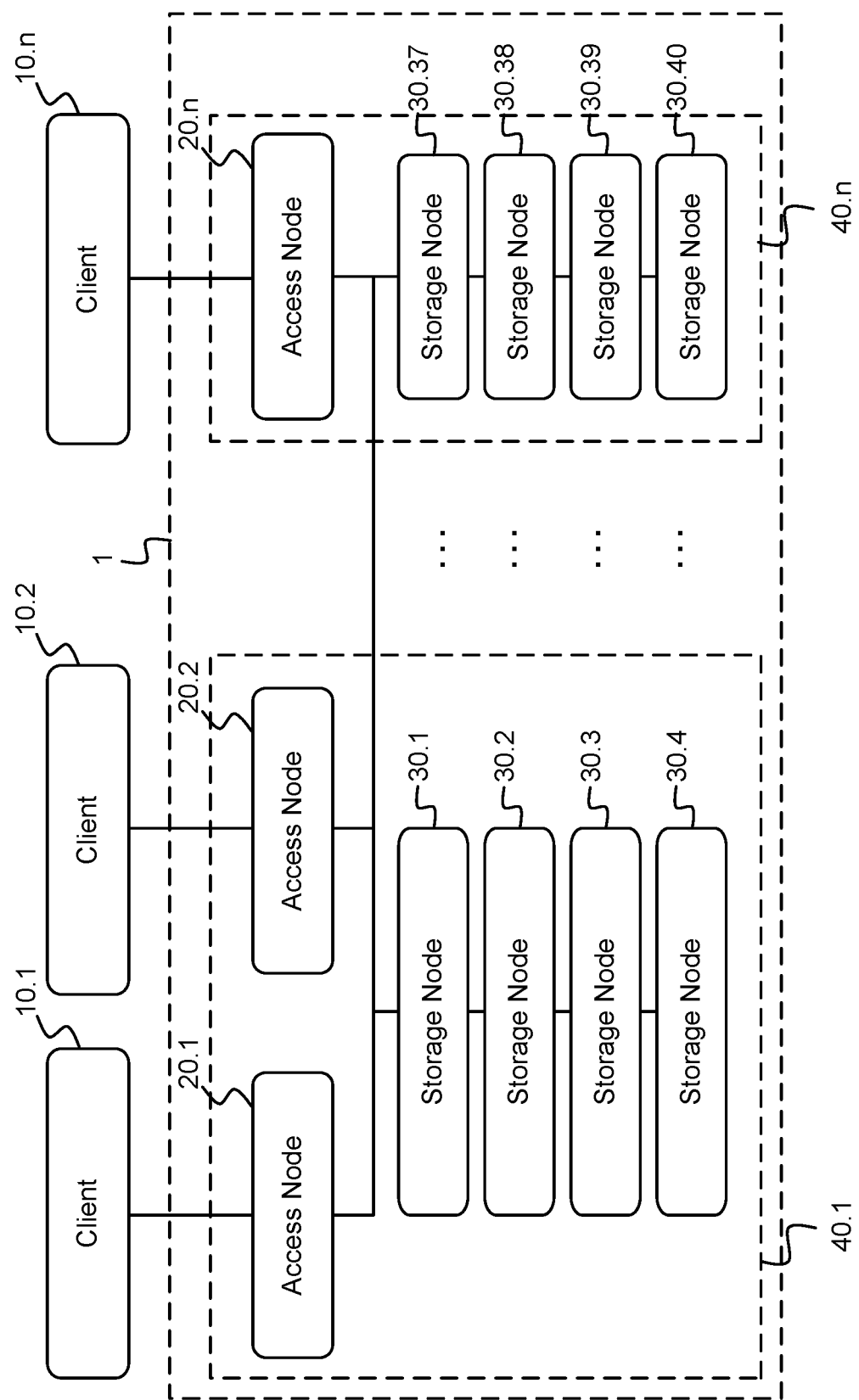
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.*n* for accessing data objects through one or more access nodes 20.1-10.*n*. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.n comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.37-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location. They are often geographically dispersed across different data centers, such as, for example, rack 40.1 can be located at a data center in Europe and 40.n at a data center in the USA.

Figure 2:
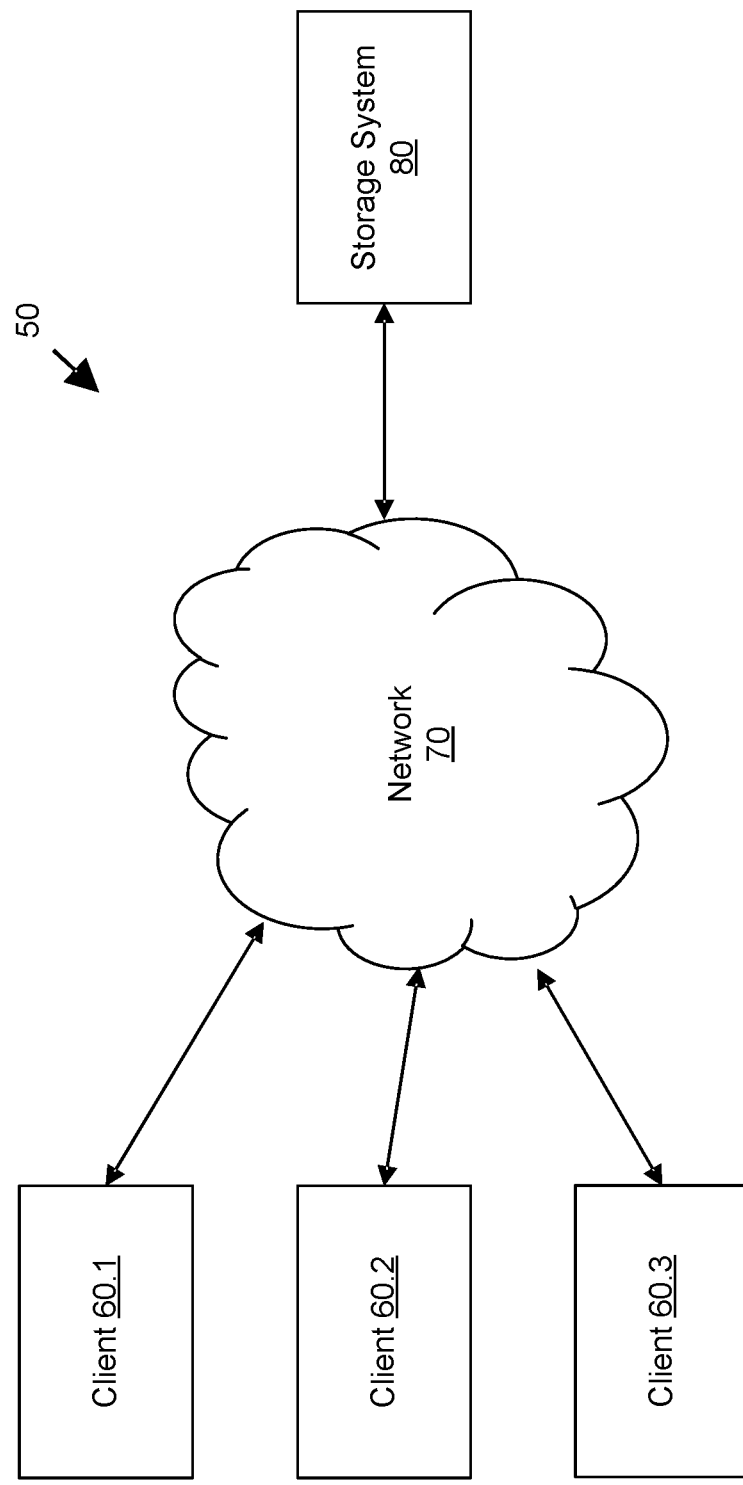
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
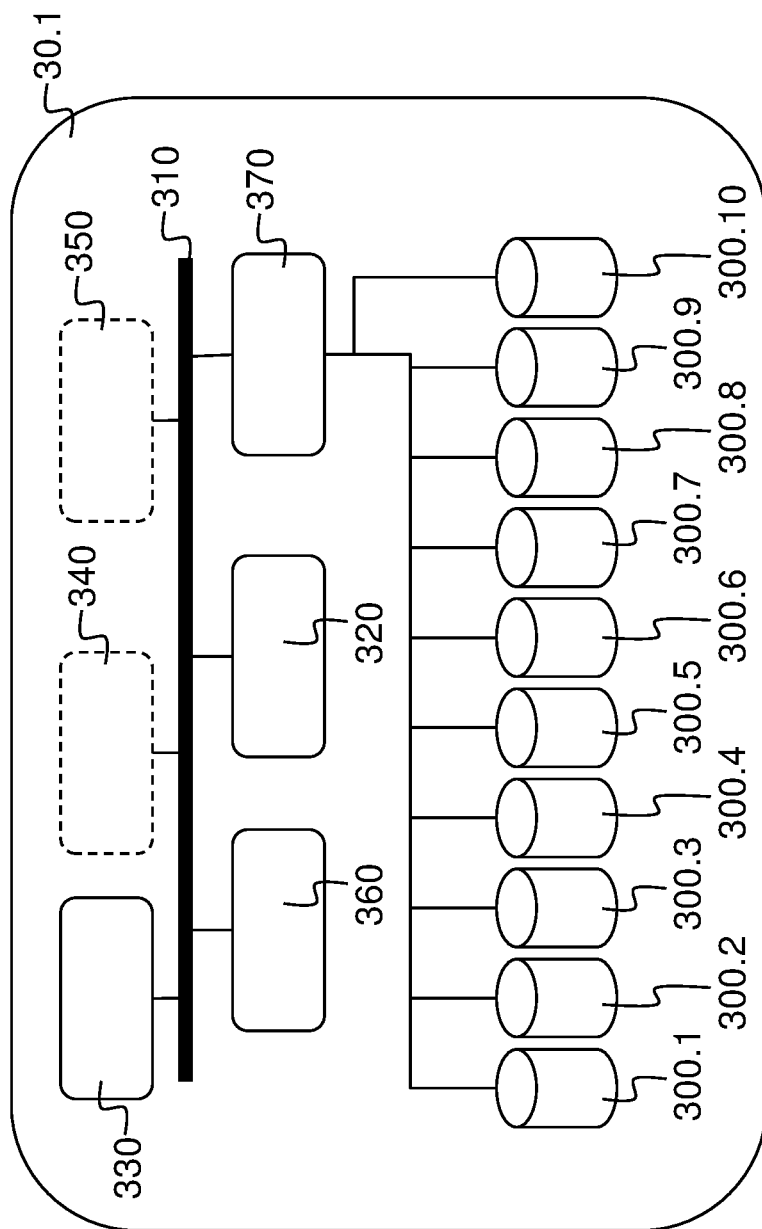
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 gigabit (Gb) Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 3 storage node 30.1 comprises ten storage elements 300.1-300.10. Other storage nodes 30 in FIG. 1 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g., 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disk spindle rotation to be synchronized. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
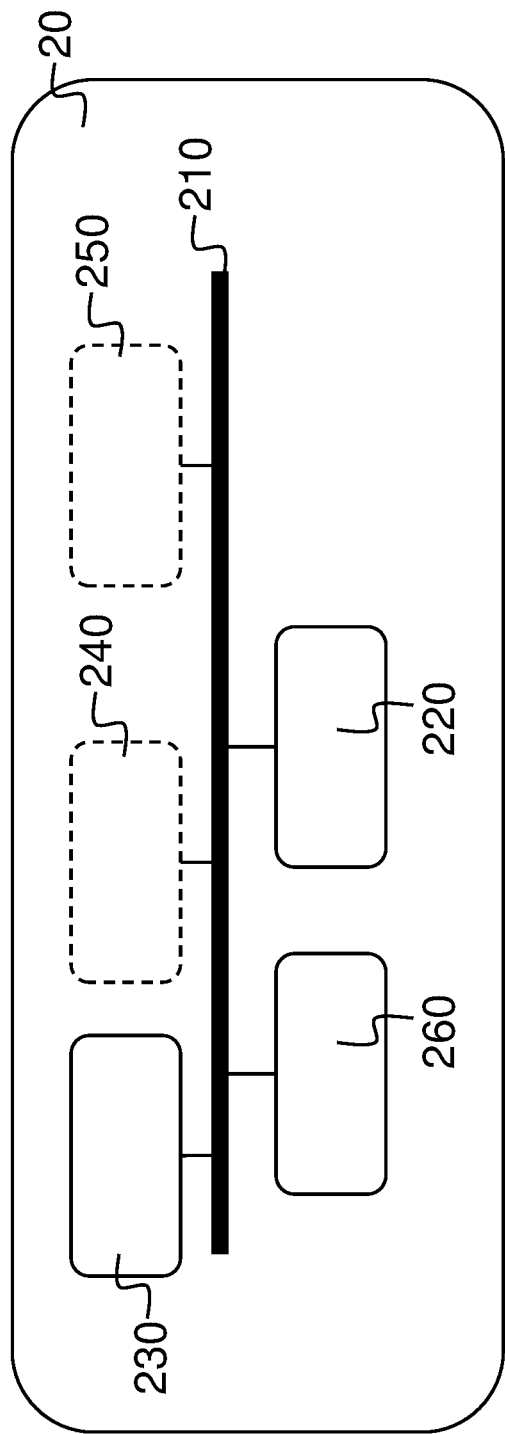
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
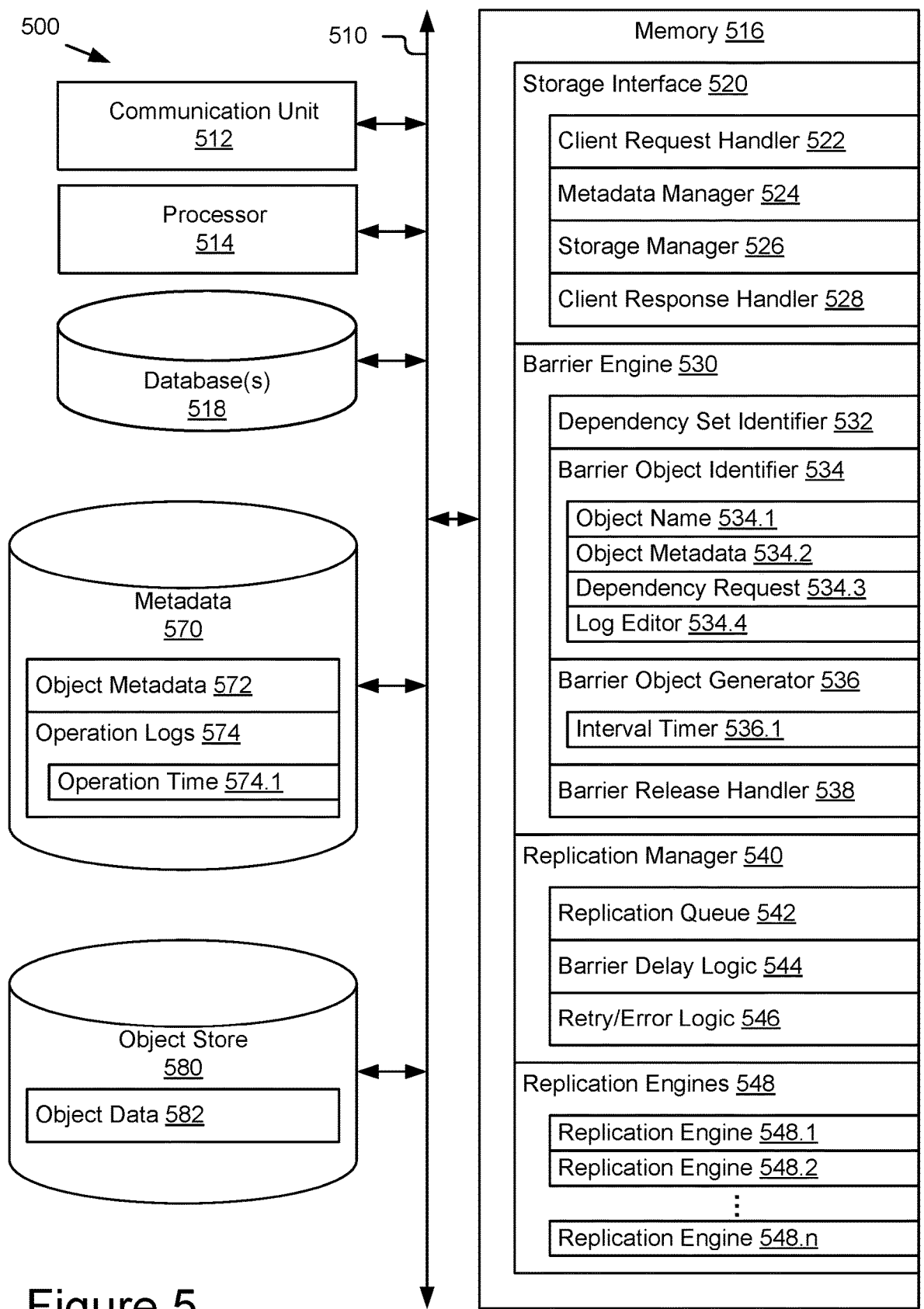
FIG. 5 schematically illustrates some example elements of an object storage system for the distributed storage system of FIG. 1.

FIG. 5 schematically shows selected modules of an access node or controller node with barrier objects, replication management, and supporting functions. Object storage system 500 may be configured as a node with an architecture and/or hardware similar to controller nodes and/or storage nodes. Object storage system 500 may incorporate elements and configurations similar to those shown in FIGS. 1-4. For example, object storage system 500 may be configured in an access node 20 with object storage management functions.

Object storage system 500 may include a bus 510 interconnecting at least one communication unit 512, at least one processor 514, and at least one memory 516. Bus 510 may include one or more conductors that permit communication among the components of access system 500. Communication unit 512 may include any transceiver-like mechanism that enables access system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Object storage system 500 may include or have access to one or more databases and/or specialized data stores, such metadata store 570 and object store 580. Databases may include one or more data structures for storing, retrieving, indexing, searching, filtering, etc. of structured and/or unstructured data elements. In some embodiments, metadata store 570 may be structured as reference data entries and/or data fields indexed by metadata key value entries related to data objects stores in object store 580. Object store 580 may include data objects comprised of object data (such as host data), some amount of metadata (stored as metadata tags), and a GUID. Metadata store 570, object store 580, and/or other databases or data structures may be maintained and managed in separate computing systems, such as storage nodes, with separate communication, processor, memory, and other computing resources and accessed by access system 500 through data access protocols. Metadata store 550 and object store 560 may be shared across multiple object storage systems 500.

In some embodiments, metadata store 570 and/or object store 580 may be sharded across multiple storage nodes. For example, object store 580 may include data objects and/or buckets of data objects that are managed across multiple storage nodes in redundant shards using replication functions to maintain substantial synchronization of available data objects. Object metadata and operations logs in metadata store 570 may be used to manage the redundant data shards and may themselves be sharded across multiple storage nodes.

Object storage system 500 may include a plurality of modules or subsystems that are stored and/or instantiated in memory 516 for execution by processor 514. For example, memory 516 may include a storage interface 520 configured to receive, process, and respond to object data requests from client systems or other nodes in distributed storage system 1. Memory 516 may include a barrier engine 530 for creating and managing barrier objects in object store 580. Memory 516 may include a replication manager 540 for processing data replication between storage nodes or storage systems, such as transferring or replicating data objects to other object stores or across shards in the same object store. Memory 516 may include replication engines 548 for use by replication manager 540 in replicating data objects and related metadata among object storage systems and/or data shards. In some embodiments, barrier engine 530 and/or replication manager 540 may be integrated into storage interface 520 and/or managed as separate libraries or background processes (e.g., daemon) through an API or other interface.

Storage interface 520 may include an interface protocol or set of functions and parameters for storing, reading, and otherwise managing data requests to an associated distributed storage system and the corresponding metadata data source for mapping file data to persistent storage data elements. For example, storage interface 520 may include functions for reading, writing, modifying, or otherwise manipulating data objects and their respective client or host data and metadata in accordance with the protocols of an object storage system.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a client response handler 528. For any given client request, storage interface 520 may receive a client request through client request handler 522 and determine one or more operations based on the content of the request. These operations may include metadata operations handled by metadata manager 524 and/or object data operations handled by storage manager 526. The results of these operations may be processed, formatted, and returned by client response handler 528.

Storage interface 520 may include one or more object storage configurations that define a storage protocol used for validating, managing, and processing object data requests. For example, object storage configurations may generally define the availability of version control for any given object or bucket, as well as specifying how the object storage system creates and manages versioning information. Object storage configurations may also define what metadata is collected and stored, as well as whether it is stored in a metadata database, such as metadata store 570, in object metadata tags stored in the data objects, and/or a combination thereof.

Client request handler 522 may include an interface and/or communication event-based condition for receiving object data requests from one or more clients. For example, client systems may send an object data request over a network connection and addressed to object storage system 500 or a port or component thereof. Client request handler 522 may receive these requests and parse them according to the appropriate communication and object storage protocols. For example, client request handler 522 may identify a transaction identifier, a client identifier, an object identifier (object name or GUID), a data operation, and additional parameters for the data operation, if any, from the received message or messages that make up the object data request.

Metadata manager 524 may include interfaces, functions, and/or parameters for creating, modifying, deleting, accessing, and/or otherwise managing object metadata, such as object metadata 572 stored in metadata store 570. For example, when a new object is written to object store 580, at least one new metadata entry may be created in metadata store 570 to represent parameters describing or related to the newly created object. Metadata manager 524 may generate and maintain an object data index for managing object metadata 572 and enabling metadata manager 524 to locate object metadata within metadata store 570. For example, metadata store 570 may be organized as a key-value store and the object data index may include key values for data objects. In some embodiments, metadata store 570 may include one or more operation logs 574 for storing time-based log entries for operations, such as write, read, delete, etc., targeting the data objects in object store 580. For example, operations related to data objects may be indexed with a key value that includes the object identifier or GUID for each object, an operation time value 574.1 (such as a timestamp or inverse timestamp) for when the operation occurred, and an operation type. In some embodiments, metadata manager 524 may also manage object metadata stored in object store 580 with object data 582. Metadata manager 524 may work in conjunction with storage manager 526 to create, modify, delete, access or otherwise manage object metadata stored as object tags within object store 580.

Storage manager 526 may include interfaces, functions, and/or parameters for reading, writing, and deleting object data elements in object store 580. For example, object PUT commands may be configured to write an object identifier, object data 582, and/or object tags to object store 580. Object GET commands may be configured to read data from object store 580. Object DELETE commands may be configured to delete data from object store 580, or at least mark a data object for logical deletion until a future garbage collection or similar operation actually deletes the data or reallocates the physical storage location to another purpose.

Other object storage commands may be handled by storage manager 526. Object storage commands processed by storage manager 526 may include parameters for accessing special functions and/or metadata resources stored with host or client data in the data objects. Storage manager 526 may work in conjunction with metadata manager 524 and barrier engine 530 for generating and managing barrier objects. Storage manager 526 may work in conjunction with replication manager 540 to replicate or migrate data from object store 560 to another data store or among shards. For example, storage manager 526 may read the object store 580 for transfer by one or more replication engines 548 managed by replication manager 540.

Client response handler 528 may include an interface and/or communication logic for sending response messages, such as result, status, or error messages, to one or more clients related to object data requests received. For example, client response handler 528 may wait for processing by metadata manager 524 and/or storage manager 526 to complete or generate an error, and then provide an appropriate result or error message to the client system(s) for each object data request received.

In some embodiments, metadata store 570 may be distributed across multiple systems, such as a plurality of access systems. Metadata store 570 and/or portions thereof may be sharded data stores, wherein the data stores are partitioned into segments stored in different computing systems. Storage interface 520 may include the functions for locating and accessing relevant portions of the sharded database.

Barrier engine 530 may be invoked by storage interface 520 to manage barrier objects in object store 560. Barrier objects may include data objects that are designated as dependent data objects and may require a group of other data objects, the dependency set of data objects for that dependent data object, to be replicated or otherwise processed through a log-based operation prior to replicating or processing the dependent data object. For example, barrier objects may be created as part of a user application request, a system management application, and/or a periodic aggregation of data store or metadata contents (e.g., a snapshot) configured as a system operation. Barrier objects may be defined by their dependence on other data objects to be valid. If data objects in the dependency set are changed or missing, then the barrier object may reference wrong or missing objects that generate errors or failures in the applications using the barrier objects. For example, a snapshot of the contents of a data bucket may only be valid as long as the contents of that data bucket as of the time of the snapshot are present. This may have particular relevance in the context of replication and assuring that the barrier object remains valid in the destination object store. As discussed above, in some systems and applications, it may be prohibitive in time, processing capacity, and other resources to attempt to validate a replicated barrier object after the fact, such as by checking all dependencies through the operation log or scan of object metadata. Barrier engine 530 may operate in conjunction with replication manager 540 to assure that the dependency set for a barrier object is replicated to a destination object store prior to replicating the barrier object itself.

Barrier engine 530 may provide interfaces, functions, and parameters for managing the use of barrier objects or dependent data objects, such as snapshots of higher-level data structures within a data store, storage node, data bucket, or other grouping of data objects. Barrier objects may include references to all data objects in a node, bucket, or other logical structure, data object metadata, log information, databases, data structures pointing to a blobstore, or similar aggregations of information related to other data objects. In some embodiments, barrier engine 530 may be included within storage interface 520, such as within library functions used by client request handler 522, metadata manager 524, storage manager 526, and/or client response handler 528 for handling requests generating or otherwise related to barrier objects.

In some embodiments, barrier engine 530 may include one or more hardware and/or software modules or data structures for executing specific operations. For example, barrier engine 530 may include a dependency set identifier 532, a barrier object identifier 534, a barrier object generator 536, and a barrier release handler 538.

Dependency set identifier 532 may include one or more parameters, data structures, and/or related methods for manipulating those parameters or data structures. Dependency set identifier 532 may be configured to determine dependency sets of data objects for barrier objects in object store 580. In some embodiments, a barrier object may be received from a client application, another data store (e.g., as the destination for replication operations), and/or generated by barrier object generator 536. Dependency set identifier 532 may identify the dependency set for the barrier object and enable replication manager 540 to track or determine whether the dependency set has been replicated. For example, dependency set identifier 532 may provide dependency set parameters to replication manager 540 for each barrier object.

In some embodiments, the dependency set for a snapshot of data objects may be defined as a function of key entries, timestamps, bucket identifiers, or other identifiers that may be applied to object metadata 572 and/or operation logs 574 to determine whether the dependency set has been replicated or processed. Functions and/or parameters defining the dependency set in terms of an existing object list, such as metadata entries or operation log entries, may avoid maintenance of a separate list of dependency set data objects for each barrier object. In some embodiments, the dependency set may include a single object or identifiable group of objects, such as blobstore object, and dependency set identifier 532 may use one or more pointers or object identifiers. For example, the barrier object or related metadata may include a list of pointers or identifiers (e.g., GUIDs) used by dependency set identifier 532 to identify the dependency set. The dependency set of data objects may include one or more data objects and, in some implementations, may millions of data objects for each barrier object.

Barrier object identifier 534 may include one or more parameters, data structures, and/or related methods for manipulating those parameters or data structures. Barrier object identifier 534 may be configured to identify barrier objects so that they can be delayed by replication manager 540 until their dependency set has been processed. In some embodiments, barrier object identifier 534 may include one or more barrier object identifier values associated with the barrier object. For example, the object name 534.1 may include one or more values, such as a string or extension (e.g., *.snapshot), that identifies data objects that include the barrier object identifier value as barrier objects. In other examples, the barrier object identifier value may be stored as object metadata value 534.2 in object metadata 572 or a metadata tag in object data 582.

In some embodiments, barrier object identifier 534 may use special commands or operations that designate barrier objects, such as dependency request 534.3. For example, barrier object identifier 534 may identify a data object as a barrier object in response to a put request or other data operation that includes an extension or argument identifying it as a dependency request 534.3 that designates the target data object as a barrier object. In some embodiments, dependency request 534.3 may include dependency set parameters for use by dependency set identifier 532. Barrier object identifier 534 may pass dependency request 534.3 to replication manager 540 to identify the barrier object and/or dependency set or may parse dependency request 534.3 and pass the barrier object identifier value and/or dependency set parameter values to replication manager 540.

In some embodiments, barrier object identifier 534 may use operation logs 574 to identify barrier objects using a log editor 534.4. For example, a barrier object identifier value may be stored in an operation log entry for an operation on the barrier object (such as the object creation or put entry). In some embodiments, the key value for an operation log entry may be modified to include the barrier object identifier value, such as adding ".snapshot" to the key value. In some embodiments, log editor 534.4 may be configured to include a barrier object identifier value in object name 534.1, as a special operation type (e.g., based on dependency request 534.3), or in an extension or other log entry data.

Barrier object generator 536 may include functions, methods, or operations for generating barrier objects. For example, responsive to a client request, system call, or an internal logic for triggering barrier objects, barrier object generator 536 may generate a snapshot of a target node, bucket, or other logical group for use as a barrier object for the dependency set it is generated from. In some embodiments, barrier object generator 536 may respond to a special command, such as a client or host request for a barrier object, or other operation for initiating the generation of a barrier object. For example, storage interface 520 may support one or more snapshot operations and requests specifying a target object store, node, bucket, or other group of data objects and may cause barrier object generator 536 to create a corresponding barrier object for the specified dependency set. In some embodiments, storage interface 520 may support one or more other operations for generating barrier objects for other types of dependent data objects, such as log or metadata snapshots, database or blobstore reference capture, etc. and may invoke barrier engine 530 and/or barrier object generator 536 to generate the desired barrier object based on parameters in the request and one or more object generation functions.

In some embodiments, barrier object generator 536 may be configured to generate barrier objects automatically to support system management and/or application functions. For example, barrier object generator 536 may be configured to generate a snapshot at predetermined intervals during operation of object data store 500. In some embodiments, the predetermined intervals may be implemented through an interval timer 536.1. For example, interval timer 536.1 may be configured for a predetermined time interval, such as every 5 minutes, and use a clock function to monitor the elapsed time in the interval to initiate the next barrier object generation. In some embodiments, interval timer 536.1 may interact with one or more additional logical rules for determining whether and when a barrier object is generated. For example, reaching the time interval may trigger one or more additional assessments of state, such as whether or not replication of a prior barrier object has completed, to determine whether the barrier object generation should be initiated or more time should be added to the interval to allow the other trigger conditions to be completed.

Barrier release handler 538 may include functions, methods, or operations for responding to completion of an operation that releases the barrier object. For example, once replication of the dependency set has been completed, the barrier object may be released from the delay or hold that kept it from being processed through the operation. In some embodiments, an operation manager, such as replication manager 540, may include logic for delaying processing of the barrier object and may automatically release the barrier object and process it responsive to completion of the dependency set. In some embodiments, barrier release handler 538 may monitor the progress of the operation and determine when the dependency set has completed in order to release the barrier object for processing. In some embodiments, barrier release handler 538 may generate or trigger additional operations responsive to releasing the barrier object. For example, barrier release may trigger barrier object generator 536 to generate a next barrier object or trigger a confirmation message to a client application or system utility regarding release of the barrier object.

Replication manager 540 may include functions, methods, or operations for managing the transfer of data objects to other object stores or object storage systems. For example, replication manager 540 may manage one or more replication engines 548 that move data objects from object store 580 to a destination object store that may be remote from object store 580. In some embodiments, replication manager 540 may transfers each data object, including object data 582 and any associated object tags. In some embodiments, replication manager 540 may also transfer metadata associated with the data object from a corresponding metadata store, such as metadata store 570, including object metadata 572.

In some embodiments, replication manager 540 may be configured for asynchronous data transfers using a plurality of replication engines 548. For example, a scheduler may select objects for transfer based on criteria other than the order in which they were ordered within object store 560, such as object size, availability, etc. In some embodiments, replication engines 548.1-548.*n* may operate in parallel and transfer data objects, including data objects in one or more dependency sets, at similar times and using resources and paths that may result in different transfer rates. Thus, the data objects may be ingested at the destination system in a different order than they were stored in object store 580 or even a different order than they were sent. In some embodiments, replication manager 540 may manage a dedicated set of replication engines or a dynamically allocated subset of replication engines shared with one or more other replication managers. Replication manager 540 may also support multipart data object transfers that include a plurality of write transactions to complete a single object replication. For example, a multipart write process may include a series of commands or messages, such as INIT, multiple PARTPUT, and COMPLETE functions.

In some embodiments, replication manager 540 may include one or more hardware and/or software modules or data structures for executing specific operations. For example, replication manager 540 may include a replication queue 542, barrier delay logic 544, and retry/error 546.

Replication queue 542 may include one or more parameters, data structures, and/or related methods for organizing data objects identified for replication. For example, data objects may be identified from a command, request, or background operation for replication to a destination data store or shard and added to a data structure embodying replication queue 542. In some embodiments, replication queue 542 may be generated by parsing operation logs 574 in order of operation time 574.1, such as in order of the timestamps associated with each operation log entry. In some embodiments, replication queue 542 may be ordered or reordered based on logic for enforcing service levels, load balancing across replication engines 548, or other efficiency or priority considerations. Replication queue 542 may support parallel replication by replication engines 548 and may include multiple queues and/or selection logic for determining which replication selects one or more data objects from replication queue 542.

Barrier delay logic 544 may include functions, methods, or operations for enforcing the delayed transfer of barrier objects to ensure that all data objects in the corresponding dependency set have been replicated to the destination data store. For example, barrier delay logic 544 may identify barrier objects in replication queue 542 and/or prior to being added to replication queue 542 and place them in a hold register or hold queue to prevent them from being passed to replication engines 548. In some embodiments, barrier delay logic 544 may place a flag in the entry for a held barrier object in replication queue 542 that indicates that the barrier object should not be selected or assigned to a replication engine until the barrier object is released and the flag is removed.

Retry/error logic 546 may include a data structure of maintaining a list of failed replication requests that may be retried through an iterative retry process. For example, replication errors, such as failure of a replication engine and/or destination data store to confirm successful storage at the destination data store, may trigger an iterative retry process may be enabled for a fixed number of retries, retry period, or other limit on retry attempts. In some embodiments, replication queue 542 may include a retry queue, such as an operations table, with entries for each pending replication request and one or more parameters for determining priority, number of attempts, and other replication data relevant to managing retry attempts. In some embodiments, retry/error logic 546 may include a barrier object failure condition triggered when the retry attempts fail and either the barrier object or any dependency set object cannot be verified as successfully replicated to the destination data store. For example, if one or more dependency data objects remain in the retry/error queue for a predetermined period or number of attempts, retry/error logic 546 may generate a replication failure error for the barrier object that may be communicated to a client application, such as through client response handler 528, or to a system administrator or another system utility.

Memory 516 may include additional logic and other resources (not shown) for processing object data requests, such as modules for generating, queueing, and otherwise managing object data requests. Processing of an object data request by storage interface 520 may include any number of intermediate steps that yield at least one data request to the distributed storage system.

Figure 6:
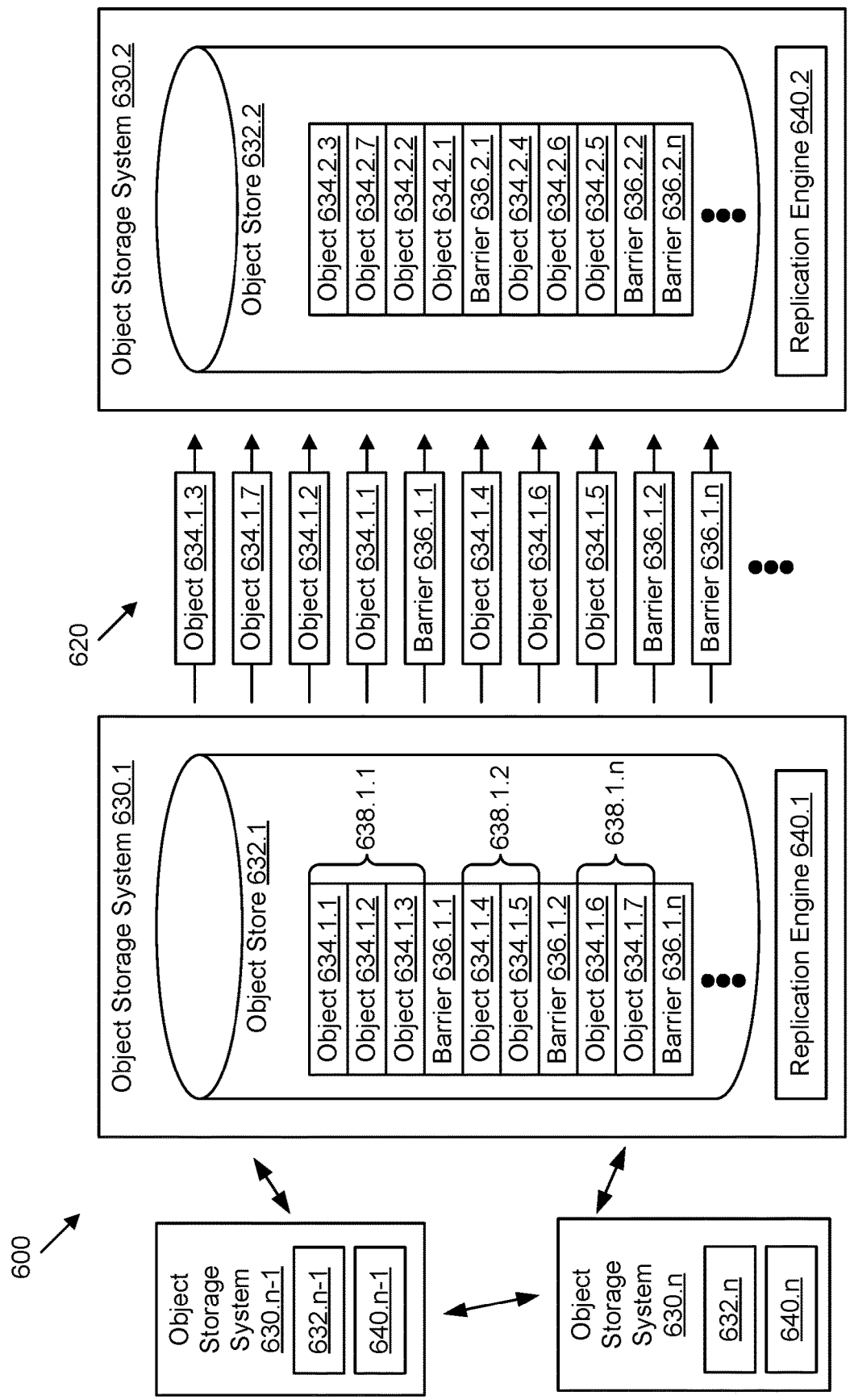
FIG. 6 schematically illustrates data objects transferred between example data stores using replication barriers.

FIG. 6 shows data objects 634 transferred among example object storage systems 630.1-630.$n$ in a distributed storage system 600 using barrier objects 636 during an operating period. In some embodiments, object storage systems 630 may be configured according to the systems and elements described with regard to FIGS. 1-5. In the example shown, a series of data objects 634 may be replicated from object storage system 630.1 to 630.2 using replication engines 640 and using barrier objects 636 to assure that dependency sets 638 of data objects 634 are completed before the barrier objects 636 themselves are transferred. While the transfer is shown occurring between object storage system 630.1 and 630.2, the same replication process may be carried out with any number of object storage systems 630.$n$-1 and 630.$n$. Similarly, each object storage system 630.2-630.$n$ may similarly include replication engines 640 for replicating objects from their respective object stores 632 to the other object storage systems 630 using a similar process.

In the example shown, data objects 634.1.1, 634.1.2, and 634.1.3 may form a dependency set 638.1.1 for barrier object 636.1.1. Data objects 634.1.4 and 634.1.5 may form dependency set 638.1.2 for barrier object 636.1.2. Data objects 634.1.6 and 634.1.7 may form dependency set 638.1.$n$ for barrier object 636.1.$n$. The order shown for object store 632.1 may be the order in which data objects 634 were received and stored and the barrier objects 636 were generated and stored in object store 632.1. However, their replication order 620 may be different due to the efficient use of parallel replication, different network storage paths, temporary errors, or other variations. For example, data object 634.1.3 may be the first data object replicated and data object 634.1.7, from dependency set 638.1.$n$, may be the second data object replicated. Object storage system 630.1 may, as described above, delay each barrier object 636 until it confirms that the dependency set 638 for that barrier object has been replicated.

As a result, object storage system 630.1 does not send barrier object 636.1.1 until data object 634.1.1 completes replication of dependency set 638.1.1, which includes data objects 634.1.1, 634.1.2, and 634.1.3. The same is true for each other barrier object 636.1.2 and 636.1.$n$. One or more data objects 634 may be sent out of sequence and/or ahead of a prior barrier object completing replication. The trigger condition for complete replication of the dependency set that allows for replication of the corresponding barrier object is replication of each data object in the replication set, regardless of order. Object storage system 630.1 does not send barrier object 636.1.2 until data object 634.1.5 completes replication of dependency set 638.1.2 and does not send barrier object 636.1.$n$ until data object 634.1.6 completed replication of dependency set 638.1.$n$. In some embodiments, the order of barrier objects 636 may be maintained even though dependency set 638.1.$n$ completed before dependency set 638.1.2.

Object storage system 630.2 may store the data objects and barrier objects in the order they were received. For example, data objects 634.2.3, 634.2.7, 634.2.2, and 634.2.1 may be stored before barrier object 636.2.1 and data objects 634.2.4, 634.2.6, and 634.2.5 may be stored before barrier objects 636.2.2 and 636.2.$n$. Client application requests and background operations targeting barrier objects 636 in object storage system 630.2 may therefore rely on barrier objects 636 to continue to be supported by their dependency sets 638 as soon as the barrier objects 636 appear on object storage system 630.2.

Figure 7:
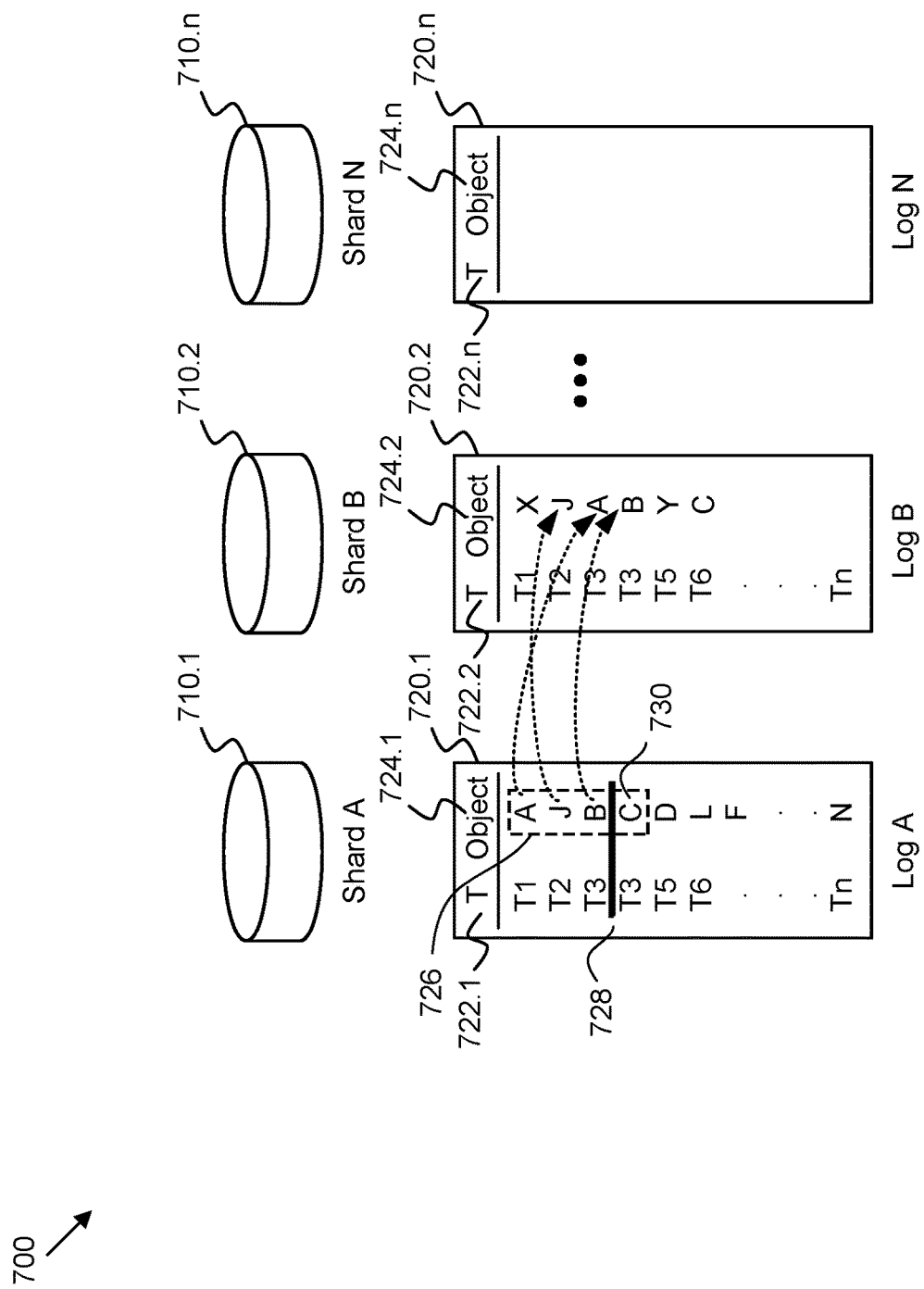
FIG. 7 schematically illustrates data objects transferred in a sharded object storage system.

FIG. 7 shows a sharded object storage system 700 where data objects are being replicated across data shards 710.1-710.$n$. In some embodiments, object storage system 700 may be configured according to the systems and elements described with regard to FIGS. 1-5. Each shard 710 may have a corresponding operation log 720.1-720.$n$. In the example shown, operation logs 720 include timestamps 722 and object identifiers 724.

Operations in the time-based operation log 720.1 may proceed along timestamps 722.1 from T1 to Tn. The group of objects 726 may represent a related group of data objects A, J, B, and C. A replication barrier 728 may have been set at time 3 to generate or identify data object C as barrier object 730. As described above, once data object C is designated barrier object 730 and the remaining data objects in group of objects 726 are identified as the dependency set preceding replication barrier 728, data objects A, J, and B may be replicated in any order and data object C will only be transferred once transfer of the others is complete.

Shard 720.2 may be operating at the same time as shard 720.1, but operation log 720.2 may record data operations on shard B based on local timestamps 722.2 (i.e. T1 in Log A may not be the same as T1 in Log B). As shown, shard B may receive data objects, such as X and Y, from other sources, such as client applications or other shards, in addition to objects J, A, and B being replicated from shard A. Shard 720.2 may receive the dependency set of data objects J, A, and B in a different order than they were created or appeared in operation log 720.1, but all three must be received before data object C, barrier object 730, may be replicated. As shown, data object B is the last in the dependency set received by shard B at T3 and data object C is received at T6.

Figure 8:
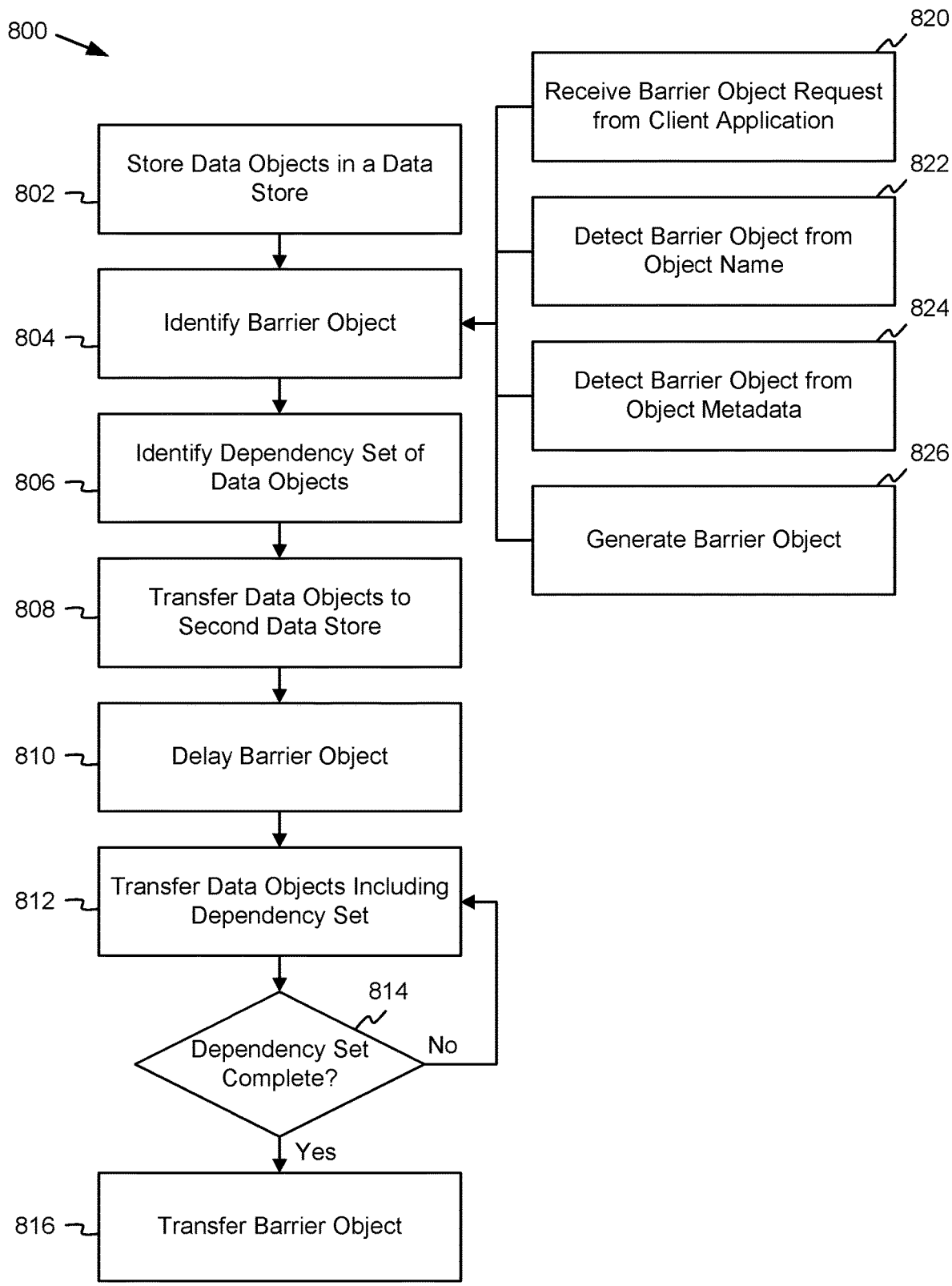
FIG. 8 illustrates an example method for using barrier objects in data transfers.

As shown in FIG. 8, the object storage system 500 may be operated according to an example method for transferring data objects using barrier objects, i.e. according to the method 800 illustrated by the blocks 802-826 of FIG. 8.

At block 802, data objects may be stored in a data store. For example, a storage interface for the object storage system may write data objects to a data store in a distributed storage system based on one or more client applications supported by the object storage system.

At block 804, a barrier object may be identified among the data objects. For example, a barrier engine may identify or determine one or more dependent data objects that may be treated as barrier objects to ensure that, when the dependent data objects are replicated, they are valid when received by the destination data store.

At block 806, a dependency set of data objects may be identified among the data objects for each barrier object. For example, the barrier engine may identify or determine a set of data objects including at least one data object (and not including the barrier object itself) that is required on the destination system for the dependent data object to be valid.

At block 808, data objects may be transferred or replicated to a second or destination data store. For example, a replication manager may identify data objects to be transferred to another object storage system or shard in a replication queue and the queued data objects may include the dependency set and the barrier object itself.

At block 810, the barrier object may be delayed to ensure that the dependency set is transferred first. For example, the replication manager may identify the barrier object to be held in a secondary queue or similar location and monitor the transfer of the dependency set for completion.

At block 812, transfer of the data objects, including the dependency set, may continue. For example, the dependency set may be included in an active replication queue to be allocated to replication engines for parallel replication to the destination data store along with other data objects and, in some cases, other replication requests to other data stores.

At block 814, whether or not the dependency set has been completely transferred may be evaluated. For example, the replication manager may monitor progress through the dependency set and trigger further processing when a progress value representing completion of all transfers for the dependency set is met or exceeded. If no, the dependency set may need more time to complete and method 800 may return to block 812. If yes, transfer of the dependency set may be complete and method 800 may proceed to block 816.

At block 816, the barrier object may be transferred to the destination object store. For example, the replication engine may return the barrier object to the primary replication queue, releasing the hold on the barrier object, and allocate it to the replication engines for replication to the destination storage system.

Block 820-826 may represent example methods supporting the identification of barrier objects at block 804. At block 820, a barrier object request may be received from a client application. For example, the storage interface may support one or more special commands that include parameters designating a received object storage request as targeting a dependent data object that should be treated as a barrier object.

At block 822, a barrier object may be detected from the object name. For example, the storage interface may enforce a naming convention, such as a prefix or extension to the object name, that designates a data object as a barrier object.

At block 824, a barrier object may be detected from object metadata. For example, the storage interface or barrier engine may monitor object metadata for specific fields, flags, values, or other metadata parameters that identify the corresponding data object as a barrier object.

At block 826, a barrier object may be generated by the object storage system. For example, the barrier engine may be configured to generate barrier objects, such as snapshots, on a regular basis to support application and/or data management requirements.

Figure 9:
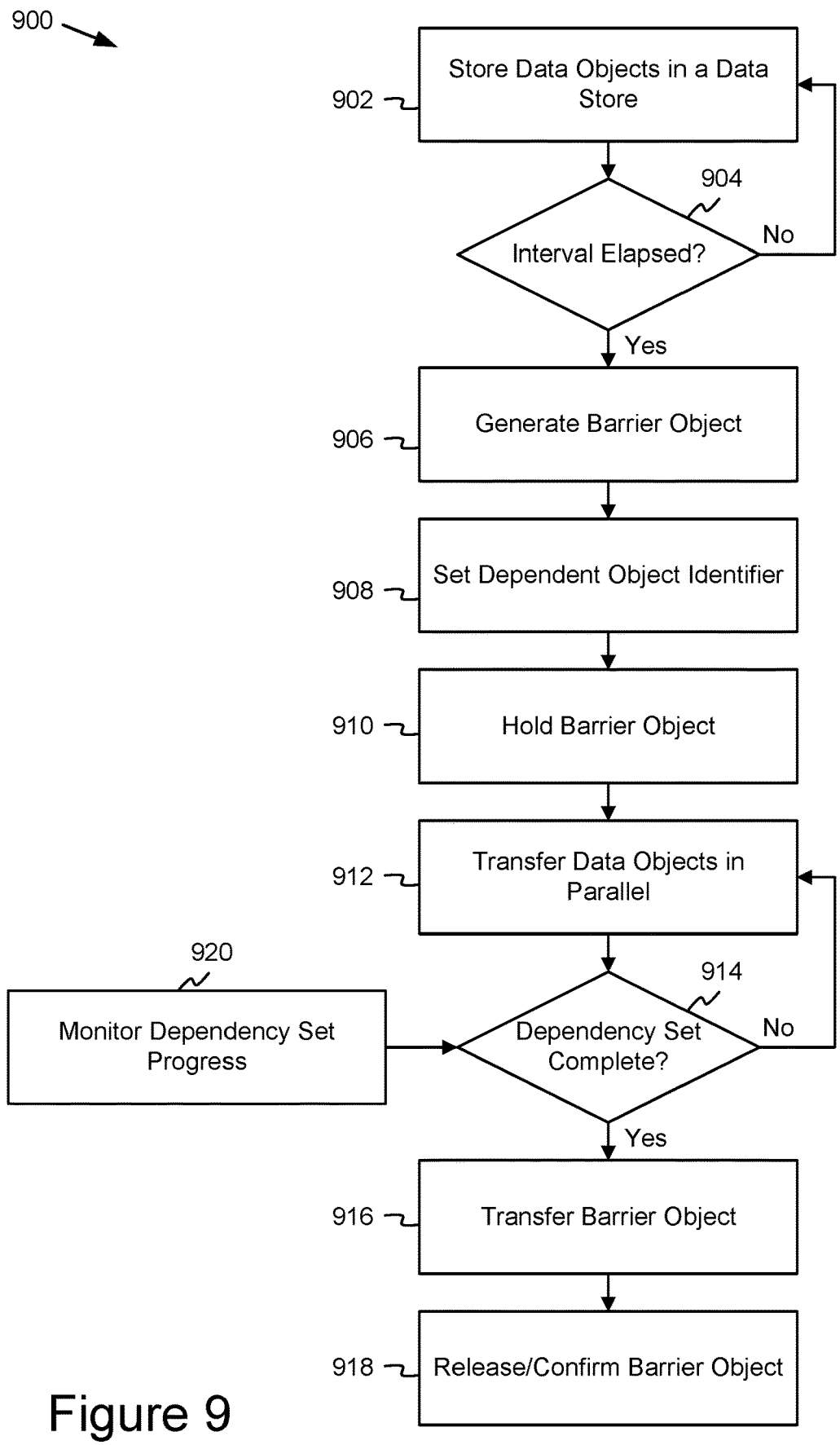
FIG. 9 illustrates another example method for using barrier objects in data transfers.

As shown in FIG. 9, the object storage system 500 may be operated according to an example method for generating barrier objects, i.e. according to the method 900 illustrated by the blocks 902-920 of FIG. 9. In some embodiments, method 900 may operating in conjunction with one or more blocks of method 800 in FIG. 8.

At block 902, data objects may be stored in a data store. For example, a storage interface for the object storage system may write data objects to a data store in a distributed storage system based on one or more client applications supported by the object storage system. Data object may be continuously stored, read, and otherwise manipulated during the operation of the object storage system and the client applications it supports.

At block 904, an interval for barrier generation may be evaluated to determine whether the interval has elapsed. For example, a barrier engine may monitor a clock value and compare the elapsed time to a predetermined interval since the last barrier object was generated. If no, the interval has not elapsed and method 900 may return to block 902 to continue data storage operations. If yes, the interval has elapsed and method 900 may proceed to block 906.

At block 906, a barrier object may be generated. For example, the barrier engine or storage interface may trigger a snapshot of the present state of the object store or one or more components thereof. The validity of the snapshot may be dependent on the underlying data objects referenced in the snapshot being present in the same object store as the snapshot.

At block 908, a dependent object identifier may be set for the new barrier object. For example, the snapshot data object may have a dependent object identifier, such as a keyword, naming convention, metadata flag, or similar parameter value, added to the object data and/or object metadata to identify the snapshot as a dependent data object and barrier object.

At block 910, the barrier object may be held to prevent replication or other operation processing. For example, a replication manager may identify the barrier object to be held in a separate queue, register, or other data structure until the dependency set of the barrier object has been successfully transferred.

At block 912, data objects may be transferred in parallel using a plurality of replication engines. For example, the replication manager may maintain a replication queue of data objects ready for transfer to one or more other object stores and may allocate data objects for transfer to a plurality of replication engines for parallel replication.

At block 914, whether or not the dependency set has been completely transferred may be evaluated. For example, the replication manager may monitor progress through the dependency set and trigger further processing when a progress value representing completion of all transfers for the dependency set is met or exceeded. If no, the dependency set may need more time to complete and method 900 may return to block 912. If yes, transfer of the dependency set may be complete and method 900 may proceed to block 916.

At block 916, the barrier object may be transferred to the destination object store. For example, the replication engine may return the barrier object to the primary replication queue, releasing the hold on the barrier object, and allocate it to the replication engines for replication to the destination storage system.

At block 918, the barrier object may be released and/or confirmed to one or more other systems or users. For example, the replication request or operation for the barrier object may have a pending or held status while the dependency set of data objects are being transferred and, upon transfer of the barrier object at block 916, the status may change to complete and/or an appropriate confirmation or response message may be sent to relevant users or systems. In some embodiments, a barrier object identifier may be removed from an operations log to release the barrier object.

At block 920, progress of the transfer of the dependency set may be monitored. For example, the replication manager and/or barrier engine may monitor a progress value for the replication operation against dependency set of data objects and the progress value may be used for the evaluation at block 914.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
    at least one processor;
    at least one memory;
    an operations log, stored in the at least one memory, configured to store a plurality of time-based log operation entries for completed storage operations targeting a first plurality of data objects in a first object data store, wherein the first plurality of data objects includes a dependency set of data objects;
    a barrier engine, stored in the at least one memory for execution by the at least one processor, configured to:
        identify, based on timestamps in the plurality of time-based log operation entries for the dependency set of data objects, a dependency between the dependency set of data objects and a barrier object in the first plurality of data objects;
        identify the barrier object in the operations log; and
        set, in a time-based operations log entry for the barrier object in the operations log, a barrier object identifier value; and
    a replication manager, stored in the at least one memory for execution by the at least one processor, configured to transfer the first plurality of data objects from the first object data store to a second object data store by:
        transferring the dependency set of data objects to the second object data store;
        determining, responsive to the barrier object identifier value in the operations log, the barrier object;
        delaying, while the replication manager is transferring the dependency set of data objects to the second object data store, the transfer of the barrier object to the second object data store; and
        releasing the barrier object responsive to completion of transferring the dependency set of data objects, wherein the timestamps for the dependency set of data objects are earlier than a timestamp for the barrier object in the plurality of time-based log operation entries.

2. The system of claim 1, wherein the replication manager is further configured to use a plurality of replication engines operating in parallel to transfer the first plurality of data objects.

3. The system of claim 2, wherein:
    at least one later data object from the plurality of data objects:
        has a first time value later than a second time value of the barrier object; and
        is not included in the dependency set of data objects; and
    the plurality of replication engines is configured to transfer the at least one later data object before the barrier object.

4. The system of claim 1, wherein the barrier object comprises a snapshot of the dependency set of data objects.

5. The system of claim 4, wherein the barrier engine is further configured to generate the barrier object based on the dependency set of data objects.

6. The system of claim 1, wherein:
    the first object data store is further configured to include a plurality of dependency sets in the first plurality of data objects over an operating period;
    the barrier engine is further configured to identify a plurality of barrier objects for the plurality of dependency sets at predetermined intervals during the operating period; and
    the replication manager is further configured to transfer each dependency set of the plurality of dependency sets prior to transferring each corresponding barrier object of the plurality of barrier objects.

7. The system of claim 1, wherein the barrier engine is further configured to receive a dependent object identifier for the barrier object from a client application.

8. The system of claim 1, wherein the barrier engine is further configured to identify a dependent object identifier from metadata for the barrier object.

9. The system of claim 1, wherein the barrier engine is further configured to:
    remove, responsive to the replication manager completing transfer of the dependency set of data objects, the barrier object identifier value from the time-based operation log entry for the barrier object.

10. A computer-implemented method, comprising:
    storing a first plurality of data objects in a first object data store, wherein the first plurality of data objects includes a dependency set of data objects;
    identifying, based on timestamps in time-based log operation entries for the dependency set of data objects, a dependency between the dependency set of data objects and a barrier object in the first plurality of data objects;
    identifying the barrier object in an operations log, wherein the operations log stores a plurality of time-based log operation entries for completed storage operations targeting the first plurality of data objects in the first object data store;

setting, in a time-based operations log entry for the barrier object in the operations log, a barrier object identifier value; and transferring the first plurality of data objects from the first object data store to a second object data store by:
 transferring the dependency set of data objects to the second object data store;
 determining, responsive to the barrier object identifier value in the operations log, the barrier object;
 delaying, while transferring the dependency set of data objects to the second object data store, the transfer of the barrier object to the second object data store; and
 releasing the barrier object responsive to completion of transferring the dependency set of data objects, wherein the timestamps for the dependency set of data objects are earlier than a timestamp for the barrier object in the time-based log operation entries.

11. The computer-implemented method of claim 10, wherein transferring the dependency set of data objects to the second object data store includes using a plurality of replication engines operating in parallel to transfer the dependency set of data objects.

12. The computer-implemented method of claim 11, wherein:
 at least one later data object from the first plurality of data objects:
  has a first time value later than a second time value of the barrier object; and
  is not included in the dependency set of data objects; and
 the plurality of replication engines transfers the at least one later data object before the barrier object.

13. The computer-implemented method of claim 10, wherein the barrier object comprises a snapshot of the dependency set of data objects.

14. The computer-implemented method of claim 13, further comprising:
 generating the barrier object based on the dependency set of data objects.

15. The computer-implemented method of claim 10, further comprising:
 storing a plurality of dependency sets in the first data store over an operating period;
 identifying a plurality of barrier objects for the plurality of dependency sets at predetermined intervals during the operating period; and
 transferring each dependency set of the plurality of dependency sets prior to transferring each corresponding barrier object of the plurality of barrier objects.

16. The computer-implemented method of claim 10, further comprising:
 receiving a dependent object identifier for the barrier object from a client application.

17. The computer-implemented method of claim 10, further comprising:
 detecting a dependent object identifier from metadata for the barrier object.

18. The computer-implemented method of claim 10, further comprising:
 detecting a dependent object identifier from a data object name for the barrier object.

19. The computer-implemented method of claim 10, further comprising:
 removing, responsive to completing transfer of the dependency set of data objects, the barrier object identifier value from the time-based log operation entry for the barrier object.

20. A system, comprising:
 at least one processor;
 at least one memory;
 an operations log, stored in the at least one memory, configured to store a plurality of time-based log operation entries for completed storage operations targeting a plurality of data objects in a first object data store, wherein the plurality of data objects includes a dependency set of data objects;
 means for identifying, based on timestamps in the plurality of time-based log operation entries for the dependency set of data objects, a dependency between the dependency set of data objects and a barrier object in the plurality of data objects;
 means for identifying the barrier object in the operations log;
 means for setting, in a time-based operations log entry for the barrier object in the operations log, a barrier object identifier value; and
 means for transferring the plurality of data objects from the first object data store to a second object data store by:
  transferring the dependency set of data objects to the second object data store;
  determining, responsive to the barrier object identifier value in the operations log, the barrier object;
  delaying, while transferring the dependency set of data objects to the second object data store, the transfer of the barrier object to the second object data store; and
  releasing the barrier object responsive to completion of transferring the dependency set of data objects, wherein the timestamps for the dependency set of data objects are earlier than a timestamp for the barrier object in the plurality of time-based log operation entries.

* * * * *